No. 728,455. Patented May 19, 1903.

UNITED STATES PATENT OFFICE.

EMILE A. FOURNEAUX, OF NEW YORK, N. Y., ASSIGNOR TO HERMAN A. METZ, OF BROOKLYN, NEW YORK.

AZO DYE AND PROCESS OF MAKING SAME.

SPECIFICATION forming part of Letters Patent No. 728,455, dated May 19, 1903.

Application filed October 28, 1902. Serial No. 129,088. (No specimens.)

*To all whom it may concern:*

Be it known that I, EMILE A. FOURNEAUX, a citizen of the United States, residing in New York, borough of Manhattan, and State of New York, have invented certain new and useful Improvements in Azo Dyes and Processes of Making the Same, of which the following is a specification.

In the application heretofore filed by me on September 16, 1902, Serial No. 123,558, for improvements in azo dyes and processes of making the same I have shown that the azos derived from diazotized nitroamino compounds and beta-naphthol, which being insoluble are not suitable for the manufacture of lake and pigment colors, as such in the finished state can be made available for this purpose by combining the nitrodiazo compound with beta-naphthol in the presence of a diazo compound derived from an aminosulfonic acid or by the action of a nitrodiazo compound on an azo dye derived from a diazosulfonic acid and beta-naphthol. I have since found that similar and even more valuable substances, which consist in the main of the azo dyes derived from nitrodiazo compounds and beta-naphthol in such an extremely fine state of division that they will react readily with metallic salts, forming lakes, can also be obtained by coupling the nitrodiazo compound with a mixture of beta-naphthol and other phenolic bodies, especially the sulfonic and carboxylic acids of phenols, provided that these latter bodies are used in sufficient quantities. The operation is best conducted in the ordinary way by slowly pouring the solution of the nitrodiazo body into an alkaline solution of a mixture of beta-naphthol and other phenolic body while stirring constantly, the amount of alkali being such that the reaction of the liquid is slightly alkaline after coupling. It is also desirable to use the diazo compound in such a proportion that it will just saturate the total of the phenolic bodies. In other words, for one molecular proportion of the diazo compound it is best to use such quantities of beta-naphthol and the other phenolic body that they sum up to one molecular proportion. Supposing, for instance, that one molecular proportion of paranitrodiazobenzol and beta-naphthol and beta-naphtholmonosulfonic acid F be used in the proportion of three parts of the former to one part of the latter, it would be advisable to use three-fourths of a molecular proportion of beta-naphthol and one-fourth of a molecular proportion of beta-naphtholsulfonic acid F and a sufficient amount of alkali to insure a neutral or slightly-alkaline reaction of the liquor after the combination has taken place.

In the ordinary process of manufacturing lakes from diazotized paranitranilin and beta-naphthol, which consists in mixing a suitable base with the proper amount of an alkaline beta-naphthol solution and then allowing the corresponding amount of a diazotized paranitranilin solution to run into this mixture, thus forming the insoluble azo compound in the presence of the base and precipitating it on the base, it has occasionally been customary to add small quantities of such phenolic bodies as mentioned in this application to the beta-naphthol solution in order to obtain bluer shades; but the amounts added were limited to a very small proportion, usually not exceeding five per cent. of the amount of naphthol used, as the color became partly soluble in water if more was used, which is not desirable in that process. I wish to emphasize that this method has nothing in common with my process but the materials used, nor is the proportion of these materials the essential difference, as the novelty of my process consists in the entirely-unexpected and newly-observed fact that by the addition of such phenolic bodies in sufficient quantities to the alkaline beta-naphthol solution before coupling with the nitrodiazo body the insoluble azo body resulting from the action of the nitrodiazo body on beta-naphthol is precipitated in an entirely new form of such extreme division that it reacts readily with metallic salts, forming thus insoluble lakes and being available for the manufacture of lakes by the same general methods as the soluble azo dyes commonly used for this purpose. This constitutes an essential progress. Whether the soluble azo colors incidentally formed by the action of the nitrodiazo compound on the sulfonated or carboxylic phenolic bodies participate in the precipitation when the resulting dye is used for the manufacture of lakes is immaterial. They are merely unavoidable by-products. When it is desired to vary the shade of the resulting body, it is feasible to add other diazo compounds to the nitrodiazo compound mainly used; but the total amount of diazo compounds used should be just sufficient to neutralize the total amount of phenols used, as thus the best results are obtained. After the coupling is completed it is usually preferable to add a certain amount of common salt, which facilitates filtering, and to wash the filtered product with a diluted salt solution. The product is then reduced to paste form, in which form it is applied for the manufacture of lakes.

Example 1. One hundred and thirty-eight parts paranitranilin are divided in one thousand parts water containing seventy-two parts of commercial sodium nitrite and the temperature is lowered nearly to the freezing-point by the addition of ice, when three hundred and sixty parts hydrochloric acid of 20° Baumé are added. The diazo solution thus obtained is filtered and diluted to ten thousand parts at a temperature not exceeding 15° centigrade. One hundred and fifteen parts beta-naphthol are dissolved in the calculated amount of caustic soda and the necessary amount of water. To this solution is added a solution of forty-nine parts of the sodium salt of the naphtholsulfonic acid 2.7 and two hundred and seventy-five parts of calcined sodium carbonate, and the whole diluted to ten thousand parts, maintaining the temperature at not over 15° centigrade. The diazo solution is then allowed to run slowly into the naphthol solution under continuous stirring. The solution is then allowed to stand for several hours, after which salt is added, the solution filtered, and the precipitate washed with a diluted salt solution. The dye is then made into a pulp.

Example 2. A diazo solution is prepared from one hundred and thirty-eight parts paranitranilin, as above. On the other hand, two hundred and twenty parts of paranitranilinorthosulfonic acid are dissolved in boiling water and the solution cooled finally by addition of ice nearly to the freezing-point, and one hundred and seventy parts of hydrochloric acid of 20° Baumé are added and the body diazotized by adding a solution of seventy-two parts of commercial sodium nitrite and enough water to prevent the diazo body from separating in crystalline form. Two hundred and thirty parts of beta-naphthol are dissolved in the calculated quantity of caustic soda and the necessary quantity of water, and a solution of eighty parts betaoxynaphtoic acid dissolved in the calculated amount of caustic soda, and four hundred and twenty-four parts of calcined sodium carbonate are added, the whole being made up to twenty thousand parts at a temperature not exceeding 15° centigrade. The above diazo solutions are then mixed and the mixture run slowly, while stirring constantly, into the above naphthol solution, then salted, filtered, and washed as in Example 1.

The azo dyes thus obtained can be used in the manufacture of red lake and pigment colors, being essentially composed of paranitrobenzolazobeta-naphthol or a mixture of this body with other beta-naphtholazo compounds, which forms a gelatinous paste that is insoluble in water, but so finely divided as to react readily with metallic salts and produce red lakes having a bluish undertone with a great fastness to light.

Having thus described my invention, I claim as new and desire to secure by Letters Patent—

1. The process herein described of making an azo dye suitable for the manufacture of red lake and pigment colors, which consists in coupling a nitrodiazo compound with a mixture of beta-naphthol and other phenolic compounds as herein specified in such proportions that the resulting insoluble azo compound is formed in such an extremely finely divided condition as to be suitable as such for the manufacture of lake and pigment colors, substantially as set forth.

2. The process herein described of making an azo dye suitable for the manufacture of red lake and pigment colors, which consists in combining a nitrodiazo body and another diazo body with a mixture of beta-naphthol and other phenolic compounds as herein specified in such proportions that the resulting insoluble azo compound is formed in such an extremely divided condition as to be suitable for the manufacture of lake and pigment colors, substantially as set forth.

3. An azo dye suitable for the manufacture of red lake and pigment colors, obtained by combining diazotized paranitranilin with a mixture of beta-naphthol and other phenolic bodies, and consisting essentially of paranitrobenzolazobeta-naphthol, or a mixture of this body with other beta-naphtholazo compounds, forming a gelatinous paste which is insoluble in water and so finely divided as to react readily with metallic salts and produce red lakes with a bluish undertone having a great fastness to light, substantially as set forth.

In testimony that I claim the foregoing as my invention I have signed my name in presence of two subscribing witnesses.

EMILE A. FOURNEAUX.

Witnesses:
 PAUL GOEPEL,
 HENRY J. SUHRBIER.